United States Patent Office 3,476,463
Patented Nov. 4, 1969

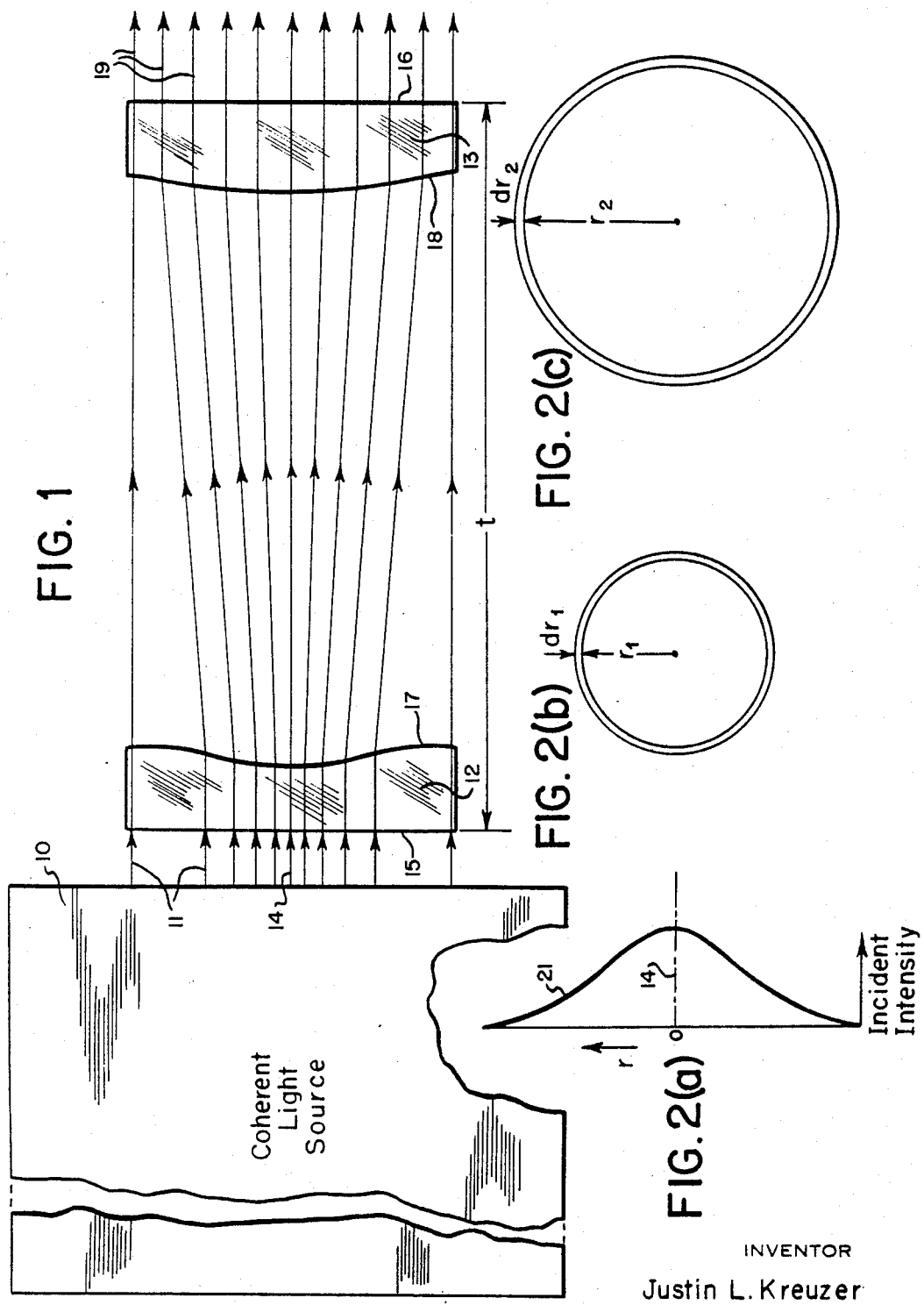

3,476,463
COHERENT LIGHT OPTICAL SYSTEM YIELDING AN OUTPUT BEAM OF DESIRED INTENSITY DISTRIBUTION AT A DESIRED EQUIPHASE SURFACE
Justin L. Kreuzer, Stamford, Conn., assignor to The Perkin-Elmer Corporation, Norwalk, Conn., a corporation of New York
Filed May 11, 1965, Ser. No. 454,810
Int. Cl. G02b 3/04, 3/00, 9/04
U.S. Cl. 350—189   7 Claims

ABSTRACT OF THE DISCLOSURE

Rays of an input beam of coherent light are redistributed to yield an output beam of different predetermined intensity distribution, and the optical path lengths are maintained constant between an equiphase surface of the input beam and a desired equiphase surface of the output beam having said predetermined intensity distribution thereover. At least two active surfaces, usually aspherical, are employed. Design equations are given for a two-element system which converts a collimated input beam of Gaussian distribution into a collimated output beam of uniform distribution.

---

This invention relates to the redistribution of the intensity of light from a coherent light source to yield a new desired intensity distribution, and particularly to the redistribution of a non-uniform beam of light to form a uniform beam.

Lasers are now well known as sources of coherent light, that is, light having an ordered relative phase. Commonly the equiphase surfaces of the beam are spherical or planar, and one may be changed to the other by conventional optical systems. In general the beam intensity is not uniform across an equiphase surface. While this may be satisfactory for some applications, in others a uniform intensity is desirable.

A beam of comparatively uniform intensity can be obtained from a non-uniform beam by utilizing only a portion thereof. Usually the center portion is most intense, and a mask having a small aperture therein may be employed. This is wasteful of light, since only a small fraction of the available light energy is utilized. Another procedure is to place a filter of non-uniform transmission in the beam so as to attenuate the bright central portion more than the edges. This also is wasteful of light.

It is a primary object of the present invention to provide an optical system capable of converting a nonuniform beam of coherent light into a uniform beam without excessive loss of energy, while preserving the equiphase wavefront or changing it in a desired manner. More generally, however, the invention can be employed to change a beam of light having an initial intensity distribution across an equiphase surface thereof into a beam having a different intensity distribution, without excessive loss of energy.

In accordance with the invention, an optical system is provided which redistributes the light rays of a beam having an initial intensity distribution into a new beam having a desired intensity distribution while keeping constant the optical paths between an initial equiphase surface and a desired output equiphase surface.

Frequently in practice it is found that the light intensity across a laser beam is closely approximated by a Gaussian or "normal" distribution. Such beams frequently have a spherical wavefront which is converted to a planar wavefront in the laser itself, or can be so converted by conventional optical means. Similarly, a beam having a planar wavefront can be converted to one having a spherical wavefront by conventional optical means. Accordingly the invention will be described in connection with a specific embodiment in which the incident beam has a Gaussian intensity distribution and a planar wavefront, and the output beam has a uniform intensity distribution and a planar wavefront. It will be understood, however, that modifications can be made within the scope of the invention for different initial intensity distributions and different output intensity distributions, and to convert from one type of wavefront to another as part of the optical design.

Figure 3:
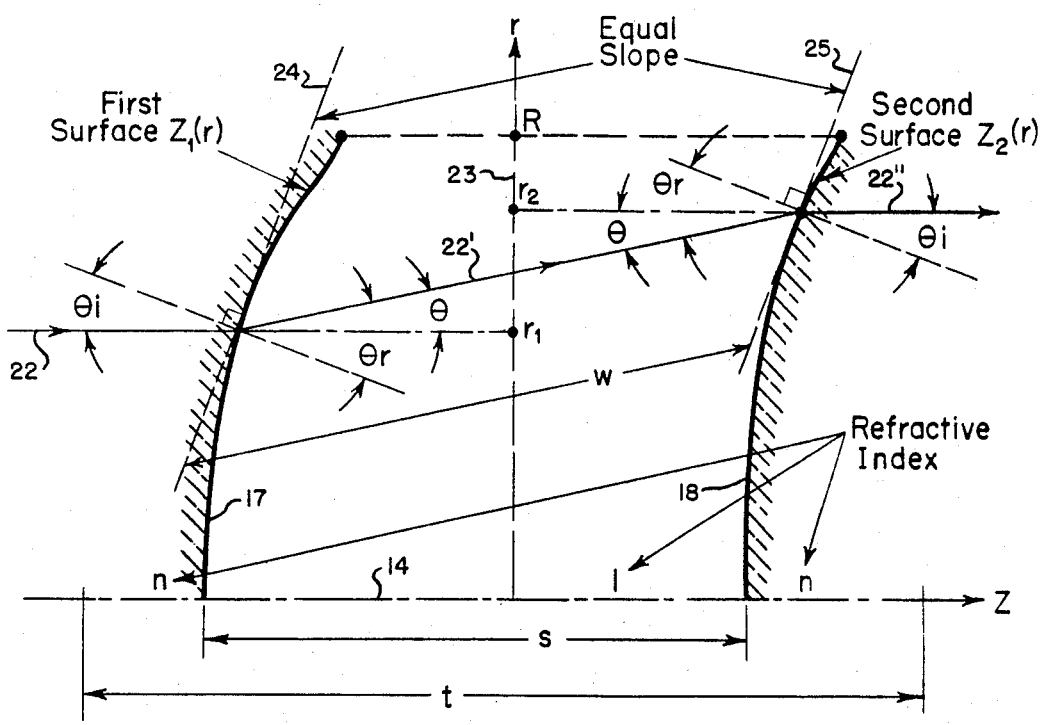
Figure 4:
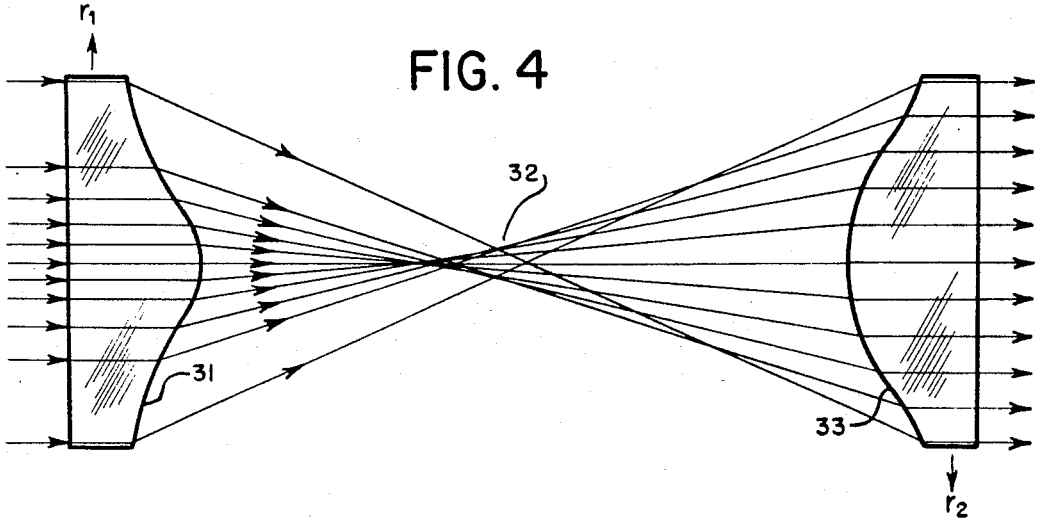

In the drawings:
FIG. 1 shows a coherent light source in conjunction with an optical system in accordance with the invention;
FIG. 2(a) shows a Gaussian distribution of incident light, and FIGS. 2(b) and 2(c) show elementary annuli of the incident beam and output beam;
FIG. 3 is a diagram explanatory of the light redistribution and collimation; and
FIG. 4 shows an alternative optical system for that of FIG. 1.

Referring to FIG. 1, a coherent light source 10 is shown which produces a collimated beam of light with a planar equiphase surface and having a non-uniform intensity distribution as shown by the spacing of light rays 11. The light source may be, for example, a gas-type laser emitting a continuous beam of light. If the wavefront of the beam produced by the laser is initially spherical, it is assumed that source 10 contains optical means for changing it to a planar wavefront. For example, a diverging spherical wavefront can be changed to a planar wavefront by a converging lens.

The optical system of the invention in the embodiment of FIG. 1 has two circular lens elements 12 and 13 shown in cross-section, and spaced along the optical axis 14 of the system. The outer surfaces 15, 16 of the lens elements are planar and perpendicular to the optical axis. The inner surfaces 17, 18 of the lens elements are aspherical surfaces symmetrical about the optical axis. The output beam is shown by exit rays 19 which are parallel to the optical axis and hence collimated with a planar equiphase surface. Inasmuch as the incident and exit rays are perpendicular to the outer surfaces 15, 16 of the lens elements, respectively, these surfaces do not deflect the rays and are hence inactive surfaces. The inner surfaces 17, 18 do change the direction of the rays and hence are active surfaces. They will hereafter be referred to as the first and second surfaces, respectively, of the lens system.

The first surface 17 functions to redistribute the rays 11 in the incident non-uniform beam of light into a substantially uniform beam at the second surface 18, as depicted by the change in ray spacings. The second surface 18 functions as a phase corrector which redirects the redistributed rays to form the desired wavefront, which in this embodiment is planar. The curvatures of surfaces 17, 18 and their spacing are mutually related to yield substantially equal optical paths for all the rays, as described in detail hereinafter.

FIG. 2(a) shows a Gaussian distribution at 21, representing the incident beam intensity $I_1$ as a function of the radius $r$ from the optical axis 14. The intensity may be written as:

$$I_1(r) = e^{-\left(\frac{r}{a}\right)^2} \text{ for } r < R \tag{1}$$

The expression $I_1(r)$ indicates that $I_1$ is a function of $r$, $e$ is the base of the Naperian logarithms, and $a$ is a constant which is a scale factor. The equation applies for values of $r$ less than R, which is the radius of lens element 12. For radii greater than R, $I_1$ is zero.

Disregarding losses due to the lens elements 12 and 13 by reflection and absorption, which may be kept small, from the law of conservation of energy the total light energy in incident beam 11 is equal to the total energy at the second surface 18. Denoting the beam intensity at the surface 18 as $I_2(r)$, and using polar coordinates $(r, \varphi)$, the following equation results:

$$\int_0^{2\pi}\int_0^R I_1(r) r\, dr\, d\varphi = \int_0^{2\pi}\int_0^R I_2(r) r\, dr\, d\varphi \qquad (2)$$

The left side of Equation 2 is the total energy in an incident beam having a distribution $I_1(r)$. The right side is the total energy in the exit beam having a distribution $I_2(r)$. In this specific embodiment $I_1(r)$ is assumed to be a Gaussian distribution given by Equation 1 and $I_2(r)$ is a constant. Since lens element 13 has a circular periphery, the total energy thereat is $I_2\pi R^2$. Hence Equation 2 becomes:

$$\int_0^{2\pi}\int_0^R e^{-\left(\frac{r}{a}\right)^2} r\, dr\, d\varphi = I_2 \pi R^2 \qquad (3)$$

Performing the integration and solving for $I_2$ yields:

$$I_2 = a^2 \left( \frac{1 - e^{-\left(\frac{R}{a}\right)^2}}{R^2} \right) \qquad (4)$$

As observed in FIG. 1, the light rays in the central region of high intensity in the incident beam are progressively spread out toward the peripheral region at surface 18. That is, rays at annular sections of greater intensity at lens 17 are redistributed in a radial direction corresponding to annular sections of lesser intensity. Thus the energy in an annulus of elementary width in the incident beam arrives at surface 18 in an annulus of larger radius. FIG. 2(b) shows an elementary annulus of radius $r_1$ and a width $dr_1$ in the incident beam. FIG. 2(c) shows the corresponding annulus in the beam at surface 18 having a radius $r_2$ and a width $dr_2$. Applying the law of conservation of energy to each pair of annuli, and using Equations 1 and 4:

$$e^{-\left(\frac{r_1}{a}\right)^2} r_1\, dr_1 = a^2 \left( \frac{1 - e^{-\left(\frac{R}{a}\right)^2}}{R^2} \right) r_2\, dr_2 \qquad (5)$$

By integrating Equation 5, the relationship between $r_1$ and $r_2$ for the end points of each ray may be obtained, giving:

$$a_2 = R \left[ \frac{1 - e^{-\left(\frac{r_1}{a}\right)^2}}{1 - e^{-\left(\frac{R}{a}\right)^2}} \right]^{1/2} \qquad (6)$$

Equation 6 gives the desired end points $r_2$ at the second surface 18 for each ray $r_1$ at the first surface 17, with a Gaussian distribution of $I_1(r)$ and a uniform distribution $I_2$. The curvature of the two surfaces 17 and 18 required for this result depends on the refractive index of the lens elements 12 and 13 and the separation between them. The curvature also depends on the scale $a$ and the size of each element.

FIG. 3 shows the relationships involved. Here the surfaces of the lens elements are shown at 17 and 18. The optical axis of the lens system is shown at 14, and is also the $z$ coordinate as indicated. The lens elements are assumed to have equal refractive indices $n$, and the region therebetween is assumed to be air having a refractive index of 1. An incident ray 22 parallel to the optical axis has a radial coordinate $r_1$ and is refracted at the first surface 17 to travel at an angle $\theta$ to the optical axis as shown by portion 22'. At the second surface 18 the ray 22' is again refracted and emerges as ray 22" parallel to the optical axis, and having the radial coordinate $r_2$. Dash line 23 represents the direction of the radial polar coordinate $r$, and the points of intersection of ray 22 with surface 17, and ray 22' with surface 18, are projected thereon as $r_1$ and $r_2$.

Tangent planes at the respective points of intersection are shown at 24 and 25. The distance between these planes in the direction of ray 22' is denoted $w$. R represents the radii of the lens elements, which are equal in this embodiment.

By geometric principles:

$$r_2 - r_1 = w \sin \theta \qquad (7)$$

Equation 7 may be used to eliminate $r_2$ in Equation 6, thus giving an expression for $r_1$ which the first surface 17 should satisfy in order to properly redistribute the light rays. However, another requirement is that the exit beam have a planar equiphase surface. This may be obtained if the optical paths of all rays are equal. Thus the curvature of the first surface 17 and the curvature of the second surface 18, which redirects the redistributed rays, should be designed together to yield equal optical paths for all rays. This may be accomplished by the following procedure.

With plane parallel outer surfaces 15, 16 of the lens elements as shown in FIG. 1, let $t$ be the distance therebetween. This distance is also shown in FIG. 3. The planes separated by the distance $t$ could also be assumed to lie within the lens elements 12, 13 but outside surfaces 17, 18.

Let $p(r)$ be the optical path between these planes. Then:

$$p(r) = w + n(t - w \cos \theta) \qquad (8)$$

The first term in the right of this equation is the optical path in air. The second term is the optical path in glass between the specified planes. For equal optical paths for all rays:

$$p(r) - p(0) = 0 \qquad (9)$$

Let $s$ be the separation of the two surfaces 17 and 18 along the optical axis. Then, from FIG. 3:

$$p(0) = s + n(t - s) \qquad (10)$$

Combining Equations 8, 9 and 10:

$$s(n-1) + w(1 - n \cos \theta) = 0 \qquad (11)$$

Snell's law for a ray incident at the first surface 17 is:

$$n \sin \theta_i = \sin \theta_r \qquad (12)$$

The angles in Equation 12 are shown in FIG. 3. As also seen from FIG. 3:

$$\theta_i = \theta_r - \theta \qquad (13)$$

As apparent from FIG. 3, the angle $\theta_i$ is the slope of the first lens surface 17, denoted $z_1(r)$, at $r = r_1$. It is also the slope of the second lens surface 18, denoted $z_2(r)$, at $r = r_2$. Accordingly:

$$\tan \theta_i = \frac{d}{dr_1} z_1(r_1) \qquad (14)$$

$$\tan \theta_i = \frac{d}{dr_2} z_2(r_2) \qquad (15)$$

It is desired to express $z_1(r_1)$ and $z_2(r_2)$ in terms of $n$, $s$, $r_1$ and $r_2$. This may be accomplished by combining Equations 7 and 11 through 15. One procedure which may be used will be summarized. Equation 7 may be solved for $w$ and substituted in 11 to yield:

$$\frac{1 - n \cos \theta}{\sin \theta} = -\frac{(n-1)s}{(r_2 - r_1)} \equiv u \qquad (16)$$

The quantity $u$ is used as a convenient notation for the right hand term of the equation. Equations 12 and 13 may be combined to eliminate $\theta_r$ and obtain an expression:

$$\tan \theta_i = -\frac{\sin \theta}{\cos \theta - n} \qquad (17)$$

The quantity $u^2$ is obtained by squaring the first term of Equation 16 and $\tan^2 \theta_i$ by squaring Equation 17. By obtaining the expression $(u^2-1+n^2)$ from the value of $u^2$ thus obtained, it will be found that:

$$\tan^2 \theta_i = \frac{1}{u^2-1+n^2} \quad (18)$$

By substituting the middle term of Equation 16 for $u$ in 18 the following is obtained:

$$\tan^2 \theta_i = \frac{1}{(n^2-1)+\left[\frac{(n-1)s}{(r_2-r_1)}\right]^2} \quad (19)$$

The square root of Equation 19 may be used in Equation 14 and the integral expressed as:

$$z_1(r) = \int_0^r \left[(n^2-1)+\left(\frac{(n-1)s}{r_2-r_1}\right)^2\right]^{-1/2} dr_1 \quad (20)$$

By using the expression for $r_2$ given in Equation 6, Equation 20 defines the first surface 17. Similarly by using the square root of Equation 19 in Equation 15:

$$z_2(r) = \int_0^r \left[(n^2-1)+\left(\frac{(n-1)s}{r_2-r_1}\right)^2\right]^{-1/2} dr_2 \quad (21)$$

An expression for $r_1$ may be obtained from Equation 6 as:

$$r_1 = a\sqrt{-\ln\left\{1-\left(\frac{r_2}{R}\right)^2 \left(1-e^{-\left(\frac{R}{a}\right)^2}\right)\right\}} \quad (22)$$

Using this expression for $r_1$ in Equation 21, the equation defines the second surface 18.

An insight into the meaning of Equations 20 and 21 may be gained by assuming that $s$ is sufficiently large so that the first term within the brackets is small compared to the second. Then Equation 20 may be approximated by:

$$z_1(r) \approx \frac{1}{(n-1)s}\int_0^r (r_2-r_1)dr_1 \quad (23)$$

The integrand in this equation is the radial displacement that the rays experience during the redistribution of beam intensity.

As an example of a detailed embodiment of the optical system shown in FIG. 1, Equations 20 and 21 were solved for values of $n=1.515$, $s=150$ mm. and $R=15$ mm. The value of $a$ was chosen so that 90% of the beam energy was utilized. This was accomplished by integrating the left term of Equation 3 between limits for $r$ of 0 to infinity to obtain total beam intensity, and between limits of 0 to R to obtain the beam intensity within the radius R. The ratio $x$ of the fractional to total beam intensity is:

$$x = 1 - e^{-\left(\frac{R}{a}\right)^2} \quad (24)$$

For $x=0.90$ and $R=15.00$ millimeters, $a$ is 9.90 millimeters. The displacement in millimeters along the $z$-axis at different radii for the first and second surfaces 17, 18 from their corresponding $z(0)$ positions is given by the following table:

TABLE 1

| $r_1$ | $z_1(r_1)$ | $r_2$ | $z_2(r_2)$ |
|---|---|---|---|
| 0.00 | 0 | 0 | 0 |
| 1.00 | .0039 | 1.60 | .0062 |
| 2.00 | .0153 | 3.16 | .0240 |
| 3.00 | .0338 | 4.68 | .0520 |
| 4.00 | .0586 | 6.14 | .0882 |
| 5.00 | .0887 | 7.50 | .1292 |
| 6.00 | .1230 | 8.76 | .1722 |
| 7.00 | .1599 | 9.92 | .2151 |
| 8.00 | .1980 | 10.96 | .2547 |
| 9.00 | .2357 | 11.86 | .2887 |
| 10.00 | .2715 | 12.64 | .3166 |
| 11.00 | .3038 | 13.32 | .3386 |
| 12.00 | .3310 | 13.88 | .3539 |
| 13.00 | .3520 | 14.34 | .3636 |
| 14.00 | .3653 | 14.70 | .3685 |
| 15.00 | .3700 | 15.00 | .3700 |

An optical system thus designed is intended for use with a beam of given spot size. In case the beam from the laser or other coherent light source is not in the proper size for the optical system, it may be made so by an appropriate magnifying or reducing optical lens. Indeed, the above detailed system has a 30 mm. diameter, and it is expected that magnification will usually be employed since laser beams commonly are only a few millimeters in diameter. The larger lens elements facilitate producing the aspheric surfaces. Similarly, if the output beam is not the desired size for an intended application, it may be magnified or reduced as required. Thus, once designed and built, the optical system of the invention can be adapted for use in a variety of applications.

Referring to FIG. 4, a modification is shown in which the redistributed rays from the first surface 31 initially are converged to cross-over in the region 32 before diverging to the second surface 33, rather than continuously diverging between the two surfaces as in FIG. 1 The surfaces for this modification can be found from Equations 20 and 21 by replacing $r_2$ by $-r_2$, thereby inverting the radius for the second surface as indicated. As will be noted, the first surface 31 is now generally convex rather than concave as in FIG. 1, and of more pronounced curvature in order to provide greater refraction angles for the same separation of the lens elements. The second surface 33 remains generally convex as in FIG. 1, but the curvature is more pronounced since the redistributed rays impinging thereon have greater divergence than in FIG. 1 for the same lens separation.

In the embodiments of FIGS. 1 and 4 the two lens elements have the same effective radius R, and the equations developed accordingly. While this facilitates design, it is not essential. If desired, the curvature of the first surface could be changed to redistribute the rays to a smaller or larger second surface, and the second surface changed to redirect the rays properly, due account being taken of the length of the optical paths as discussed above. Also, instead of separating the two active surfaces by air, they could be formed on opposite sides of a glass element. The direction of curvature of the surfaces would be reversed in order to diverge the rays at the first surface and redirect the rays along the optical axis at the second surface. The design of such a system could be accomplished with the aid of the foregoing equations by replacing $n$ by $1/n$. Since the less the separation of the two active surfaces the greater the curvatures required, this in general would lead to a very thick glass element.

If desired, instead of using planar outer surfaces 15, 16, they could be curved to produce or assist in producing the desired types of wavefronts, or to simplify the aspheric surfaces.

Many modifications are possible within the spirit and scope of the invention, as will be understood by those skilled in the art. When the principles of geometric optics apply, as in the above specific embodiments, two active surfaces suffice. However, the surfaces are often strongly aspheric. If additional active surfaces are employed to participate in the redistribution and redirection of the rays, a reduction in the severity of the aspherics may be obtained, although at the expense of a more complicated design procedure. If the initial beam distribution is not Gaussian, Equation 1 may be changed as required and suitable changes made in the other equations. If a non-uniform distribution $I_2(r)$ in the output beam is desired, it may be inserted in the right side of Equation 2 and the integration performed to establish the relationship between $I_1(r)$ and $I_2(r)$, and subsequent equations changed appropriately. If, instead of planar equiphase surfaces in the input and output beams, some other relationship is desired such as planar to spherical wavefronts or vice versa, the requirement for equal optical paths set forth in Equation 9 may be changed accordingly.

I claim:
1. An optical system for receiving an input beam of coherent light having a non-uniform axially symmetrical initial intensity distribution at an equiphase surface thereof and producing an output beam having a substantially uniform intensity distribution at a substantially planar equiphase surface thereof, said optical system comprising
(a) at least one active aspherical surface for redistributing the rays of said input beam to change the intensity distribution thereof,
(b) and at least one active aspherical surface spaced from the first-mentioned active surface for redirecting the redistributed rays to form an output beam of substantially uniform intensity distribution over a substantially planar surface thereof,
(c) the curvatures of said active surfaces and the spacing therebetween being mutually related for yielding substantially equal optical path lengths for the rays between an equiphase surface of the input beam and said substantially planar surface of the output beam having said substantially uniform intensity distribution thereover.

2. An optical system for receiving an input beam of coherent light having a non-uniform axially symmetrical initial intensity distribution at an equiphase surface thereof and producing an output beam having a substantially uniform intensity distribution at a substantially planar equiphase surface thereof, said optical system comprising
(a) refracting means including at least one aspherical surface for receiving said input beam and redistributing the beam rays to form a beam of different intensity distribution at a region spaced therefrom,
(b) and refracting means position near said region and including at least one aspherical surface for redirecting the redistributed rays to form an output beam of substantially uniform intensity distribution over a substantially planar surface thereof,
(c) said refracting means and the spacing therebetween being mutually related for yielding substantially equal optical path lengths for the rays between an equiphase surface of the input beam and said substantially planar surface of the output beam having said substantially uniform intensity distribution thereover.

3. An optical system for receiving an input beam of coherent light having a non-uniform intensity distribution approximately symmetrical about the beam axis at an initial equiphase surface thereof and producing therefrom an output beam having a substantially uniform intensity distribution at a substantially planar equiphase surface thereof, said optical system comprising
(a) at least one active aspherical surface for redistributing rays of said input beam at annular sections thereof of greater intensity in a radial direction corresponding to anular sections of lesser intensity to produce a substantially uniform intensity distribution at a region spaced therefrom,
(b) and at least one active aspherical surface positioned near said region for redirecting the redistributed rays to form an output beam of substantially uniform intensity distribution over a substantially planar surface thereof,
(c) the curvatures of said active surfaces and the spacing therebetween being mutually related for yielding substantially equal optical path lengths for the rays between an equiphase surface of the input beam and said substantially planar surface of the output beam having said substantially uniform intensity distribution thereover.

4. An optical system for receiving an input beam of coherent light having a nonuniform axially symmetrical initial intensity distribution at an equiphase surface thereof and producing an output beam having a substantially uniform intensity distribution at a substantially planar equiphase surface thereof, said optical system comprising
(a) first and second lens elements of rotational symmetry spaced apart along a common optical axis thereof,
(b) said first lens element having at least one aspherical surface for redistributing the rays of said input beam at annular sections thereof to produce a substantially uniform intensity distribution at said second lens element,
(c) said second lens element having at least one aspherical surface for redirecting the redistributed rays to form an output beam having a substantially uniform intensity distribution over a substantially planar surface thereof,
(d) said lens elements and the curvatures of said aspherical surfaces being mutually related for yielding substantially equal optical path lengths for the rays between an equiphase surface of the input beam and said substantially planar surface of the output beam having said substantially uniform intensity distribution thereover.

5. An optical system for receiving an input beam of coherent light having a non-uniform axially symmetrical initial intensity distribution at a substantially planar equiphase surface thereof and producing an output beam therefrom having a substantially uniform intensity distribution at a substantially planar equiphase surface thereof which comprises
(a) first and second lens elements of rotational symmetry spaced apart along a common optical axis thereof and having respective input and output planar surfaces perpendicular to said optical axis,
(b) said first lens element having an aspherical surface facing the second lens element for redistributing light rays in said input beam at annular sections thereof to produce a substantially uniform intensity distribution at the second lens element,
(c) said second lens element having an aspherical surface facing the first lens element for receiving the redistributed light rays and redirecting the redistributed rays to form a collimated output beam of substantially uniform intensity distribution,
(d) the curvatures of said aspherical surfaces being mutually related for yielding substantially equal optical path lengths for the rays between planar equiphase surfaces of said input and output beams.

6. An optical system for receiving an input beam of coherent light having an approximately Gaussian intensity distribution and a substantially planar equiphase surface and producing an output beam therefrom having a substantially uniform intensity distribution at a substantially planar equiphase surface thereof which comprises
(a) first and second lens elements of rotational symmetry spaced apart along a common optical axis thereof and having respective input and output planar surfaces perpendicular to said optical axis,
(b) said first lens element having an aspherical surface facing the second lens element for redistributing light rays in said input beam at annular sections thereof progressively outwards to annular sections of the second lens element to produce a substantially uniform intensity distribution at the second lens element,
(c) said second lens element having an aspherical surface facing the first lens element for receiving the redistributed light rays and redirecting the redistributed rays to form a collimated output beam of substantially uniform intensity distribution,
(d) the curvatures of said aspherical surfaces being mutually related for yielding substantially equal optical path lengths for the rays between planar equiphase surfaces of said input and output beams.

7. An optical system for receiving an input beam of coherent light having an approximately Gaussian intensity distribution and a substantially planar equiphase surface and producing an output beam therefrom having a substantially uniform intensity distribution and a substantially planar equiphase surface which comprises
(a) first and second lens elements of rotational symmetry spaced apart along a common optical axis thereof and having respective input and output planar surfaces perpendicular to said optical axis, (b) said lens elements having equal radii R from the optical axis and equal refractive indices $n$, (c) said first lens element having an aspherical surface $z_1(r)$ facing the second lens element and defined by the equation $$z_1(r) = \int_0^r \left[(n^2-1) + \left(\frac{(n-1)s}{r_2-r_1}\right)^2\right]^{-1/2} dr_1$$

wherein $$r_2 = R\left[\frac{1-e^{-\left(\frac{r_1}{a}\right)^2}}{1-e^{-\left(\frac{R}{a}\right)^2}}\right]$$

(d) said second lens element having an aspherical surface $z_2(r)$ facing the first lens element and defined by the equation $$z_2(r) = \int_0^r \left[(n^2-1) + \left(\frac{(n-1)s}{r_2-r_1}\right)^2\right]^{-1/2} dr_2$$

wherein $$r_1 = a\sqrt{-\ln\left\{1 - \left(\frac{r_2}{R}\right)^2 \left(1 - e^{-\left(\frac{R}{a}\right)^2}\right)\right\}}$$

(e) where $r_1$ and $r_2$ are radii of elemental annuli of respective first and second lens elements, $s$ is the separation of the aspherical surfaces along the optical axis, and $a$ is related by the equation $$x = 1 - e^{-\left(\frac{R}{a}\right)^2}$$

to the ratio $x$ of the integrated input beam intensity within the radius R and the total integrated beam intensity of said Gaussian distribution.

References Cited

UNITED STATES PATENTS

| | | | |
|---|---|---|---|
| 882,762 | 3/1908 | Jacob | 350—212 X |
| 2,637,242 | 5/1953 | Osterberg et al. | 350—189 |
| 3,014,407 | 12/1961 | Altman | 350—189 |

JOHN K. CORBIN, Primary Examiner

U.S. Cl. X.R.

331—94.5; 350—212, 230, 231

UNITED STATES PATENT OFFICE
CERTIFICATE OF CORRECTION

Patent No. 3,476,463                          November 4, 1969

Justin L. Kreuzer

It is certified that error appears in the above identified patent and that said Letters Patent are hereby corrected as shown below:

Column 3, equation (5), the last quantity "$dr^2$" should read -- $dr_2$ --; equation (6), the left-hand expression "$a_2$" should read -- $r_2$ --. Column 4, line 31, "in" should read -- on --. Column 5, line 74, cancel "in". Column 7, line 49, "anular" should read -- annular --. Column 9, lines 15 to 20, raise the bracketed expression to the 1/2 power.

Signed and sealed this 2nd day of June 1970.

(SEAL)
Attest:

Edward M. Fletcher, Jr.                      WILLIAM E. SCHUYLER, JR.
Attesting Officer                             Commissioner of Patents